(12) United States Patent
Hornady

(10) Patent No.: US 6,250,860 B1
(45) Date of Patent: Jun. 26, 2001

(54) APPARATUS FOR SECURING OBJECTS

(76) Inventor: B. C. Hornady, P.O. Box 846, Monroeville, AL (US) 36460

(*) Notice: Subject to any disclaimer, the term of this patent is extended or adjusted under 35 U.S.C. 154(b) by 0 days.

(21) Appl. No.: 09/528,779

(22) Filed: Mar. 17, 2000

(51) Int. Cl.[7] .................................................. B60P 7/08
(52) U.S. Cl. ............................. 410/47; 410/48; 410/50; 410/99; 410/100
(58) Field of Search ................................ 410/47, 48, 49, 410/50, 96, 97, 99, 100; 24/68 CT, 265 CD; 248/499

(56) References Cited

U.S. PATENT DOCUMENTS

| | | | | |
|---|---|---|---|---|
| 3,740,073 | * | 6/1973 | Schwichert | 410/47 |
| 4,487,537 | * | 12/1984 | Morse | 410/47 |
| 4,503,978 | | 3/1985 | Smit . | |
| 4,526,500 | * | 7/1985 | Patrick | 410/48 |
| 5,425,608 | | 6/1995 | Reitnouer | 410/49 |
| 5,538,376 | | 7/1996 | Borda | 410/99 |
| 5,954,465 | * | 9/1999 | Ellerbush | 410/49 |

* cited by examiner

Primary Examiner—Stephen T. Gordon
(74) Attorney, Agent, or Firm—Bradley Arant Rose & White LLP; John W. Smith T

(57) ABSTRACT

A device for securing objects to a surface, particularly heavy objects—such as steel coil, flat steel, or pipe—being transported by various modes of transportation, such as a flat bed trailer. The device includes a rigid member that is secured to the front to rear frame rails which run lengthwise on the underside of a flat bed trailer. The device further includes chains or other restraining elements that are secured at the opposite extremities of the rigid member, pass over or through the side rails of the flat bed trailer and over or through the payload. The device also has ratchet binders or other tightening to achieve tightening of the restraining elements. Use of the device achieves increased restraint of payloads during transportation.

12 Claims, 3 Drawing Sheets

APPARATUS FOR SECURING OBJECTS

FIELD OF THE INVENTION

This invention relates to devices for securing objects to a surface, and more particularly, to a device for securing heavy objects—such as steel coil, flat steel, or pipe—being transported by various modes of transportation, such as a flat bed trailer.

BACKGROUND OF THE INVENTION

The shipping industry is vital to commerce in the United States and in most nations around the world. In particular, the trucking industry is one of the most important branches of the shipping industry in many countries around the world including the United States. It is estimated that at least thirty to forty percent of all goods transported in the United States are hauled by trucks pulling flat bed trailers. The types of materials and commodities hauled on flat bed trailers vary dramatically. For instance, flat bed trailers are often used to transport heavy equipment, wood products, oil field materials, and steel. Many such goods can be hauled safely and with relative ease of securement to the flat bed trailer. However, some materials present difficulties for those in the shipping industry to transport securely and efficiently.

In particular, various types of payloads are difficult to transport on a flat bed trailer because of their large weight and unconventional shapes. Steel coils are one example of an item that can be difficult and dangerous to ship. Steel coils often weigh five times the weight of the flat bed trailer used to haul it. These coils are generally cylindrical in shape and may be of varying diameter. On many occasions, payloads such as steel coils, pipes and other cylindrical objects become dislodged from the bed of trailers despite the best efforts of those responsible for shipping such objects. When these massive loads become loose, there is great risk for property damage and accidents causing injury to persons.

At present, the United States Department of Transportation ("DOT") regulates the shipment of steel coils. However, in spite of DOT regulations, accidents from unsecured loads remain a problem in the shipping industry. Problems frequently occur because the payload becomes loose as a result of large lateral forces that act on the payload when the vehicle engages in a sharp turn. In addition, a payload can become unsecured over time as the vehicle undergoes routine turns and sustains vibrations and natural swaying forces while traveling great distances over roadways. Payloads can also become loose after the vehicle hauling it reaches a roll over or other extremely unstable situation. In such circumstances, the weight of the payload can cause it to break away from the present methods employed in the shipping industry for restraining objects on a flat bed trailer. Given all the above problems, it will be appreciated by those in the shipping industry that there remains a need for a safer and more effective means to transport payloads, particularly heavy payloads and payloads of cylindrical or other unconventional shapes.

There are presently several devices employed by those in the trucking industry for securing and shipping heavy, cylindrical payloads such as metal coil. The current state of the art includes devices that employ chocks wedged between the coil and the trailer bed. Reitnouer, U.S. Pat. No. 5,425,608, is one such example. These devices depend to a large extent on the weight of the payload in combination with frictional forces to hold the payload in place. In the absence of appropriate frictional forces, the payload can become unstable. Furthermore, devices such as Reitnouer often do not provide adequate restraint should the trailer bed undergo severe turns, extreme braking, or other unstable positions such as a roll over situation.

Often, some combination of holding chains, brackets and tie downs are added to attempt further securement of the payload. Borda, U.S. Pat. No. 5,538,376, is one such example. However, Borda and other such devices can be time-consuming to install. Because of the various component parts of such devices that must be assembled, these devices are cumbersome to use and are therefore prone to inadequate tightening and other human error. In addition, the chains utilized in these devices for restraining a payload are usually attached to and exert an upward component of force on the side rails of the flat bed trailer. The side rails are often made of aluminum or other lightweight material which limit the ability of these devices to perform as intended. In addition, even if the holding chains are originally tight and the load is initially secured, after the truck has traveled many miles, the side rails can yield, thus causing the chains to become loose. Finally, even if used correctly, these devices generally do not prevent the payload from becoming unrestrained should the flat bed trailer reach an overturned or other unstable position.

The general object of the present invention is to provide significantly improved restraint to heavy payloads under all circumstances, including when the vehicle transporting the payload reaches a turned over or other unexpected position. It is further an object of this invention to provide a securing device that is simple to use, thus minimizing the risk of human error that can sometimes occur and lead to unsecured loads. It is a further object of this invention to provide a device that is affordable to manufacture and purchase.

SUMMARY OF THE INVENTION

These and other objects and advantages are obtained in a device and method for securing payloads to various modes of transportation, but particularly flat bed trailers. This device includes a rigid member that is fixedly attached by connecting means to the front to rear frame rails which run lengthwise on the underside of a vehicles such as a flat bed trailer. These frame rails are generally steel I-beams and provide the primary support for the trailer bed. It is widely known that the frame rails are much stronger than the side rails relied upon by other devices and methods currently used in the industry.

The device further includes a plurality of restraining elements such as hold down chains. Said transport chains restrain the payload by passing over or through the payload, by passing over or through the side rails of the flat bed trailer, and by being secured at the opposite extremities of the rigid member by connecting means such as clevises. Said transport chains are tightened to said rigid member by standard ratchet binders, or other means available in the industry, that are attached to said restraining elements. As the ratchet binders are torqued, the transport chains pull upward on the rigid member which exerts an equal and opposing force on said transport chains. These opposing forces supplied by the rigid member to which the transport chains are attached will counteract any loosening that could occur in the transport chains due to traveling over rough or uneven roads, turning of the vehicle, or progressive yielding of the trailer frame under stress. The load limit of the present invention substantially exceeds the requirements applicable in the industry.

The present invention achieves additional advantages over the current state of the art because the ratchet binders or other means for tightening said transport chains to the rigid member are able to be located adjacent to the surface of the trailer bed. Said tightening means are therefore more easily accessed by the driver for periodic examination to ensure proper restraint of the payload. Generally, existing devices for securing payloads to flat bed trailers require that such tightening means be located above the surface of the trailer bed in a position often times out of the view of the driver and difficult to access, particularly when the payload is covered by a tarpaulin.

The present invention represents a substantial improvement over the current state of the art because it can be adapted for use on various types and sizes of flat bed trailers and potentially other vehicles without significant modifications to such vehicles. In addition, the present invention is adjustable and can be used at most any desired location on the flat bed trailer. More than one of the devices may be used on a flat bed trailer to provide additional restraint to the particular payload being hauled. In addition, because it has relatively few parts, the present invention is easy to use and install and is affordable.

BRIEF DESCRIPTION OF THE DRAWINGS

These and other objects of the present invention, as well as its advantages and capabilities, will be more filly understood by reference to the following detailed description when considered in connection with the accompanying drawings in which.

DETAILED DESCRIPTION OF THE INVENTION

Figure 1:
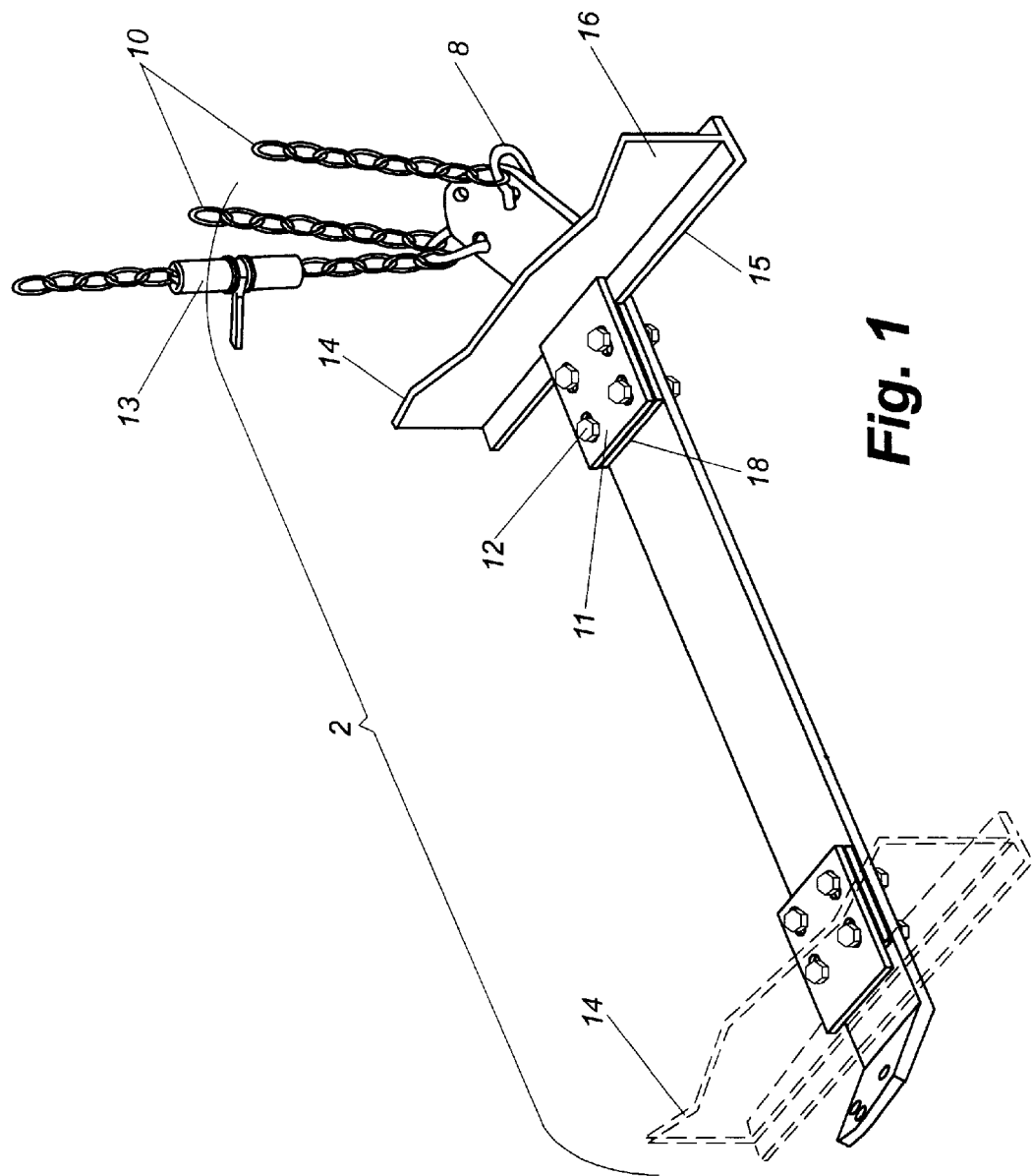
FIG. 1 is a three-dimensional view of the apparatus bolted in place.
Figure 2:
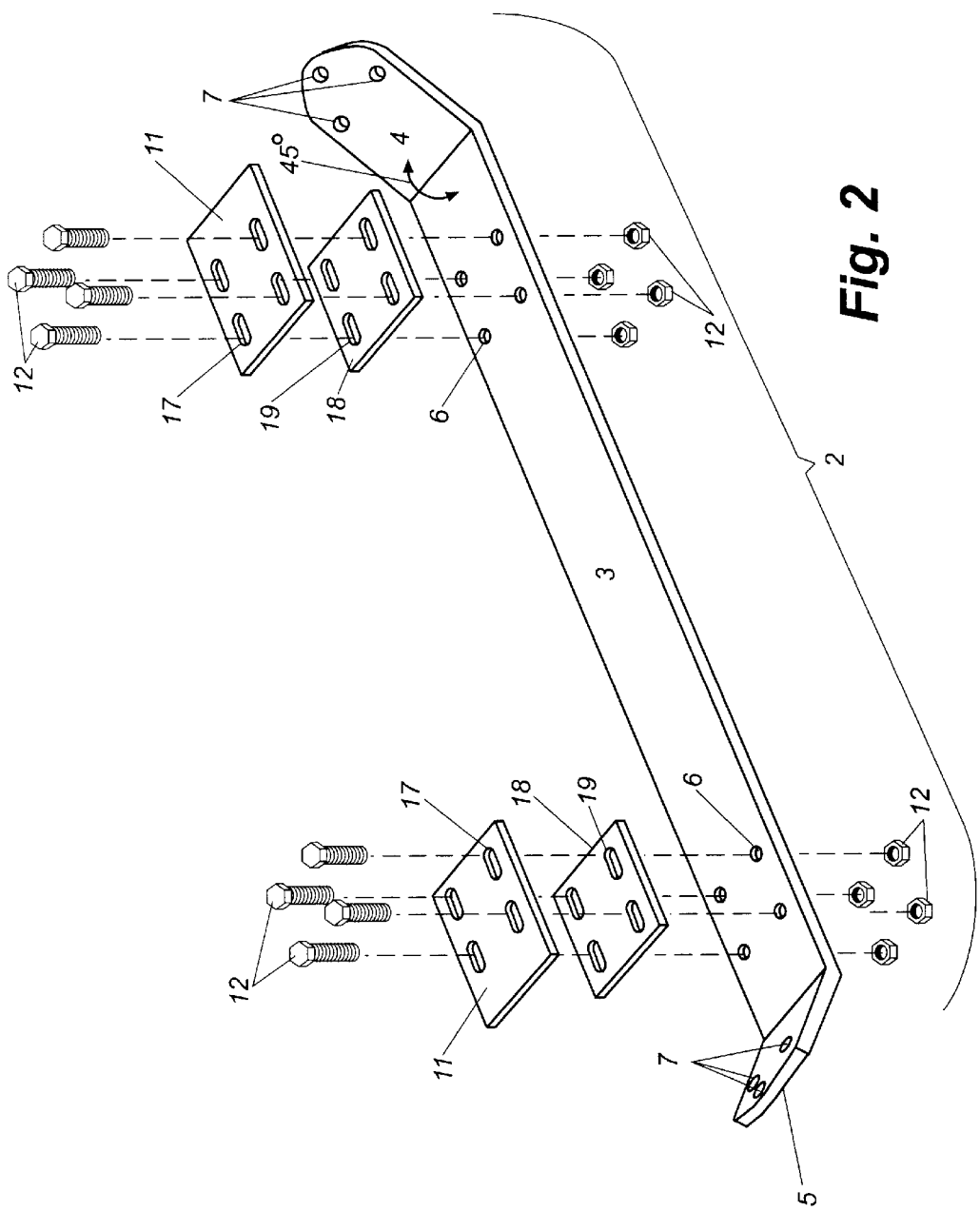
FIG. 2 is an exploded, three-dimensional view of the rigid member, flanges and spacers.
Figure 3:
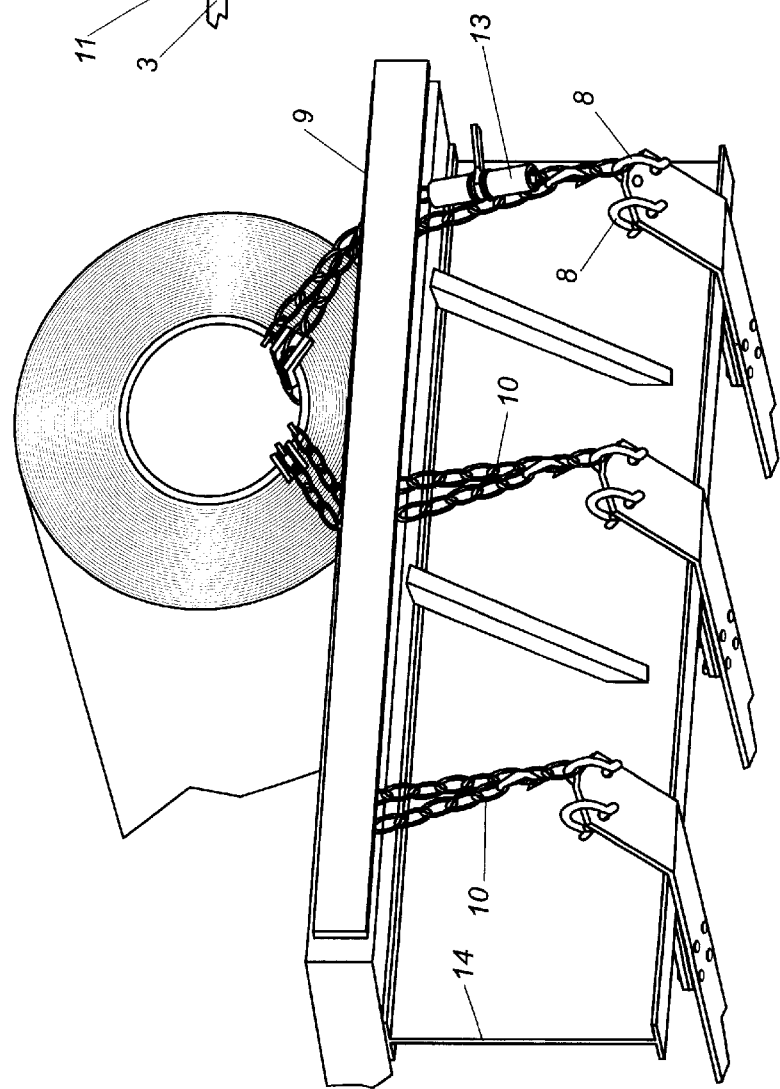
FIG. 3 is a partial three-dimensional view of the present invention in use on a flat-bed trailer.

Referring to FIGS. 1, 2 and 3, the apparatus for securing objects for shipment is illustrated. Although the field of application of the present invention will include various modes of transportation, it is anticipated that the present invention will find its most widespread use in connection with the transportation of heavy, cylindrical payloads, such as steel coils, on flat bed trailers. The apparatus comprises a rigid member 2 that is able to be fixedly attached to the front to rear frame rails 14 which run lengthwise on the underside of a vehicle such as a flat bed trailer, as will be described further below. Said frame rails 14 are generally much stronger than the side rails of flat bed trailers relied upon by other devices and methods currently used in the industry.

As shown most clearly in FIG. 2, rigid member 2 comprises a base 3, a first extremity 4 and a second extremity 5 extending from opposite ends of base 3. Said first extremity 4 and second extremity 5 accommodate a means for connecting said rigid member 2 to a plurality of restraining elements 10, such as transport chains, ropes or straps. In the preferred embodiment, it is recommended that Grade 70 transport chains be utilized to achieve the most effective restraint. In the illustrated preferred embodiment, said first and second extremities, 4 and 5 respectively, are sufficiently angled with respect to said base 2 to provide proper transference of the tensile forces created by tightening of restraining elements 10. It is recommended that the optimum angle to achieve this condition is approximately 45 degrees, as shown in FIG. 2.

The shape and dimensions of said rigid member 2 need not be defined exactly. In the illustrated preferred embodiment, said rigid member is elongated and generally rectangular in shape. It will be appreciated by those skilled in the art that said base 3 of rigid member 2 should be of sufficient length to span the front to rear frame rails 14 on the underside of the flat bed trailer, and that said first extremity and said second extremity 5 should be of sufficient length to provide the capability of accommodating said connecting means without extending beyond the plane defined by the side of the flat bed trailer. To best mate with most frames of a tractor trailer, it is envisioned that the length of base 3 of rigid member 2 will be approximately 44 inches, and the length of rigid member 2 will be approximately 64 inches. It will be further appreciated that rigid member 2 should be of sufficient width to accommodate connecting means for receiving a plurality of restraining elements 10. It is envisioned that a width of about 8 inches is sufficient to accomplish this. However, it is further emphasized that rigid member 2 can be adaptably shaped to mate with the underside of most any vehicle that may be used for transporting objects.

Referring to FIGS. 1, 2 and 3, in the preferred embodiment, said connecting means comprises a plurality of clevises 8 pivotally attached to compatibly sized holes 7 in first and second extremities, said clevises 8 having passages for receiving said restraining elements 10. A ¾" clevis is recommended for best results. It is anticipated that other possible means for connecting said rigid member 2 to said restraining elements 10 could be utilized in place of said clevises 8, but it will be further appreciated that the use of clevises or similar devices will best ensure the integrity of the restraining elements when the apparatus is in use.

It will be appreciated by those skilled in the art of transporting heavy loads that optimum restraint requires utilizing ratchet-type binders 13 or other means for tightening said restraining elements 10. As said ratchet binders 13 are torqued, said restraining elements 10 pull in upward fashion on the rigid member which exerts an equal and opposing force on said restraining elements. It is recommended that said rigid member 2 be comprised of material that causes rigid member 2 to exert opposing forces on said restraining elements 10 to counteract any loosening that could occur in the restraining elements 10 due to traveling over rough or uneven roads, turning of the vehicle, or progressive yielding of the trailer frame under stress. At the same time, rigid member 2 should be comprised of material that is sufficiently durable to provide significant restraining forces for securing heavy payloads in compliance with governmental regulations. In the preferred embodiment, it is recommended that rigid member 2 is made of at least 130,000-PSI rated steel.

It will be further understood by referring to FIG. 3 that, when the device is assembled and in use, the location of said connecting means such as clevises 8 will be sufficiently below the surface 9 of the flat bed trailer, such that there will be a sufficient length of the restraining elements 10 extending from said connecting means to the surface 9 of the flat bed trailer. This feature of the device permits said ratchet binders 13 to be attached to said restraining elements 10 at a point below the surface 9 of the flat bed trailer, as shown in FIG. 3. Consequently, utilization of the present invention results in superior accessability to the ratchet binders 13 by the individuals responsible for assuring the proper restraint of the payload. It will be further understood that such accessability will exist whether or not the payload is covered.

The apparatus is further comprised of at least a pair of flanges 11 having a plurality of elongated slots 17 that align with bolt holes 6 located in base 3 when secured in position by bolting means 12. Said flanges 11 will provide the means by which rigid member 2 is secured to the front to rear frame rails which run lengthwise on the underside of the flat bed trailer or other vehicle as will now be further explained.

Referring to FIGS. 1 and 2, front to rear frame rails 14 are steel I-beams having a lower lip 15 of generally uniform thickness protruding in perpendicular fashion from the inside face 16 of said frame rails 14. Each of said flanges 11 is positioned on base 3 such that a portion of each flange 11 clamps onto said lower lip 15 as the flange 11 is tightened by bolting means 12. Spacers 18 of approximately the same thickness as lower lip 15 and having bolt apertures 19 are inserted between flanges 11 and base 3 and abutting lower lip 15. It will be appreciated that, upon assembly, spacers 18 provide stabilizing support for flanges 11 upon tightening of bolting means 12. Bolt apertures 19 of spacers 18 align with elongated slots 17 of flanges 11 and bolt holes 6 of base 3 upon application of bolting means 12. It will be appreciated that said elongated slots 17 enable said flanges 11 to be slidably adjusted to protrude sufficiently over spacers 18 and achieve clamping over lower lip 15. Said bolting means 12 must be of sufficient length to extend through said flange 11, said spacer 18 and said base 3. Drilling of additional bolt holes in other locations on base 3 permits said flanges and spacers to be attached to other positions on said base 3 for mating of the device with non-standardized carriage frames.

It is further envisioned that in the preferred embodiment, the surfaces of base 2, flange 11, and spacers 18 are knurled or otherwise coarsened to provide additional frictional forces upon tightening by bolting means. It is also anticipated that other means by which flanges 11 are connected to said spacers 18 and said base 3 can be utilized to achieve clamping of flange 11 on lip 15. For example, rather than using bolts and apertures, adjustable clamps may be employed to tighten said flanges 11, spacers 18, and base 3.

Although said flanges 11 and spacers 18 can be permanently affixed to said base 3 by welding or casting, this is not recommended. Utilization of said bolting means 12 or other means of securement, permits the tightening of said flanges 11 and said spacers 18 on most any position on the base. Consequently, it will be appreciated that the present invention is able to be adapted to various sizes and spacing of trailer frame rails with relative ease. It will be further appreciated that, when attached and tightened, said flanges reduce the risk of slippage or movement of the apparatus in relation to the trailer bed.

Figure 4:
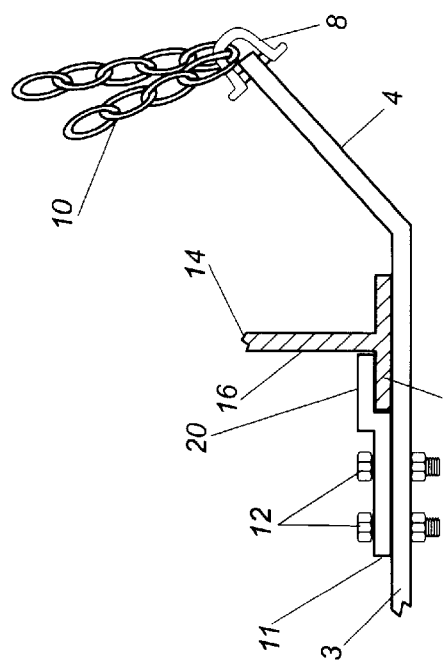
FIG. 4 is a partial side view of the apparatus utilizing the alternative embodiment of the flange.

An alternative embodiment is achieved by modifying the shape of flange 1 1. As illustrated in FIG. 4, a raised, protruding edge 20 is fashioned at one end of flange 11. It will be appreciated that, so fashioned, flange 11 can be bolted to base 3 such that said raised, protruding edge 20 achieves clamping over lower lip 15 without the need for spacer 18.

Having described the basic concept of the present invention, it will be understood by those skilled in the art that the foregoing detailed disclosure is intended to be presented by way of example only, and is not limiting. Various alternations, improvements and changes will occur and are in the scope of the present invention. Accordingly, the present invention is limited only by the following claims and equivalents thereto.

What is claimed is:

1. An apparatus for securing an object to a surface, said apparatus comprising:
   (a) a rigid member having a base, a first extremity, and a second extremity, said first and said extremity extending from opposite ends of said base;
   (b) a plurality of restraining elements;
   (c) a connecting means for connecting said restraining elements to said first and second extremities;
   (d) flanges;
   (e) spacers for insertion between said flanges and said base; and
   (f) clamping means for clamping said flanges to said spacers and said base.

2. The apparatus of claim 1 wherein said first and second extremities extend at angles from said base.

3. The apparatus of claim 1 wherein said connecting means comprises a plurality of clevises pivotally attached to said first and second extremities, said clevises having passages for receiving said restraining elements.

4. The apparatus of claim 1 further comprising tightening means for tightening said restraining elements.

5. The apparatus of claim 4 wherein said means for tightening comprise ratchet binders.

6. The apparatus of claim 1 wherein said clamping means comprises bolts and nuts sized to be received by a plurality of aligned apertures located in said base, said spacers and said flanges.

7. The apparatus of claim 6 wherein said apertures of said flange are elongated slots.

8. The apparatus of claim 1 wherein said restraining elements comprise transport chains.

9. An apparatus for securing an object to a surface, said apparatus comprising:
   (a) a rigid member having a base, a first extremity and a second extremity, said extremities extending at angles from opposite ends of said base;
   (b) a plurality of clevises pivotally attached to said extremities;
   (c) a plurality of restraining elements attached to said clevises;
   (d) means for securing said base to the underside support structure of a vehicle.

10. The apparatus of claim 9, wherein said means for securing said base comprises a flange, said flange having a first end and a second end, said first end of said flange being slidably attached to said base of said rigid member.

11. The apparatus of claim 10, further comprising a spacer for insertion between said base and said flange.

12. The apparatus of claim 10, said second end of said flange having a raised, protruding edge.

* * * * *